(12) United States Patent
Finkelstein et al.

(10) Patent No.: US 8,214,442 B2
(45) Date of Patent: Jul. 3, 2012

(54) FACILITATING AN EXTENDED IM SESSION IN A SECURE WAY

(75) Inventors: Barbara Finkelstein, Riverdale, NY (US); Itzhack Goldberg, Hadera (IL); Boaz Mizrachi, Haifa (IL); Vladimir Soroka, Karmiel (IL)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 12/186,275

(22) Filed: Aug. 5, 2008

(65) Prior Publication Data

US 2010/0036916 A1     Feb. 11, 2010

(51) Int. Cl.
  *G06F 15/16*     (2006.01)
(52) U.S. Cl. ........................................ 709/206
(58) Field of Classification Search .................. 709/206
  See application file for complete search history.

(56) References Cited

U.S. PATENT DOCUMENTS

| | | | |
|---|---|---|---|
| 6,301,609 B1 | 10/2001 | Aravamudan et al. | |
| 6,539,421 B1 * | 3/2003 | Appelman et al. | 709/206 |
| 6,691,162 B1 * | 2/2004 | Wick | 709/224 |
| 6,988,128 B1 * | 1/2006 | Alexander et al. | 709/206 |
| 7,295,657 B1 * | 11/2007 | Keohane et al. | 379/88.23 |
| 7,383,303 B1 * | 6/2008 | Bort | 709/206 |
| 7,451,184 B2 * | 11/2008 | Malik et al. | 709/206 |
| 7,552,177 B2 * | 6/2009 | Kessen et al. | 709/206 |
| 7,593,984 B2 * | 9/2009 | Morris | 709/203 |
| 7,730,143 B1 * | 6/2010 | Appelman | 709/206 |
| 7,765,265 B1 * | 7/2010 | Granito et al. | 709/206 |
| 7,774,416 B2 * | 8/2010 | Callanan et al. | 709/206 |
| 8,037,147 B1 * | 10/2011 | Herold et al. | 709/206 |
| 2002/0169841 A1 * | 11/2002 | Carlson et al. | 709/206 |
| 2004/0093387 A1 * | 5/2004 | Wick | 709/207 |
| 2004/0111477 A1 | 6/2004 | Boss et al. | |
| 2004/0254998 A1 * | 12/2004 | Horvitz | 709/206 |
| 2005/0251555 A1 | 11/2005 | Little, II | |
| 2006/0031326 A1 * | 2/2006 | Ovenden | 709/206 |
| 2006/0123347 A1 | 6/2006 | Hewitt et al. | |
| 2006/0168204 A1 * | 7/2006 | Appelman et al. | 709/224 |
| 2007/0124393 A1 * | 5/2007 | Maes | 709/206 |
| 2007/0203995 A1 | 8/2007 | Wang et al. | |
| 2008/0219445 A1 * | 9/2008 | Yato et al. | 380/255 |
| 2008/0263158 A1 * | 10/2008 | del Cacho et al. | 709/206 |
| 2009/0077180 A1 * | 3/2009 | Flowers et al. | 709/206 |
| 2009/0327429 A1 * | 12/2009 | Hughes et al. | 709/206 |
| 2009/0327441 A1 * | 12/2009 | Lee et al. | 709/206 |
| 2010/0036928 A1 * | 2/2010 | Granito et al. | 709/206 |

* cited by examiner

*Primary Examiner* — Wing Chan
*Assistant Examiner* — Alicia Baturay
(74) *Attorney, Agent, or Firm* — Michael J. Buchenhorner; Derek S. Jennings (57) ABSTRACT

A method includes steps of: receiving a prompt from a user to activate a message interface in order to begin a session; activating the message interface such that said message interface is presented to the user and is able to receive input from the user; receiving user input from the message interface, including: a user selection of at least one target correspondent; and a first message to be sent to the at least one target correspondent; identifying the session with a unique identifier; and sending the first message to a messaging system for delivery to the target correspondent when the target correspondent is available.

23 Claims, 6 Drawing Sheets

FACILITATING AN EXTENDED IM SESSION IN A SECURE WAY

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The present invention deals with Instant Messaging (IM) environments and methods to prolong an IM session beyond one synchronous encounter.

BACKGROUND OF THE INVENTION

IM (Instant Messaging) technology enables instantaneous conversation between users through a computer. It has become widespread throughout both office and home environments because it is very similar to a face-to-face meeting. Some IM sessions actually turn into extended conversations. For example, one person sends a colleague an IM that begins with "hi." The sender does not get an immediate response, even though the sender remains online. It may be quite a while before the colleague responds. Indeed, many IM conversations are conducted in this non-continuous—and potentially frustrating—way, giving rise to the ubiquitous "r u there?" IM message. It would be useful if one could send a secure, meaningful business-like message to a peer while that peer is away from his/her desk. When he/she returns, he/she will be able to read the message and respond to it.

Current systems propose different tools to deal with this situation. For example, some applications (such as IBM Lotus Sametime) provide the history of the last conversation with the specified user. Moreover, a list of all history conversations can be obtained if this feature is turned on. However, in order for this solution to facilitate an extended conversation, one needs to write an intended question or message and leave it until the user presumably comes to the screen. This is unsecured, since the screen might be open and might potentially be observed by other users. In addition, different responses from the remote user can potentially require different messages to be sent. For example, if the remote user says "yes" to a previous question "did you finish the task I gave you?" the answer should be "Great, thanks," while "no" would prompt "when do you think you can do it?"

Hence a better technique to facilitate extended IM conversation is required.

SUMMARY OF THE INVENTION

Briefly, according to an embodiment of the present invention, a computer-implemented method includes steps or acts of: receiving a prompt from a user to activate a message interface; activating the message interface such that said message interface is presented to the user and able to receive input from said user; receiving user input from the message interface, said user input comprising: a user selection of at least one target correspondent and a first message to be sent to the at least one target correspondent; and transmitting the first message to a messaging system for delivery to the target correspondent when said target correspondent is detected to be available.

The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We discuss a method to facilitate extended IM sessions in a secure way. This method provides for the automatic anticipated reception of an instant message, and secure, delayed instant messaging. The message will not be sent to the intended recipient until there is some indication that she/he is actually able to read the message, so that the instant message is not visible on the recipient's computer while she/he is away from her/his desk.

The method according to an embodiment of the present invention provides the following advantages and improvements to instant messaging:

a) enables an IM message recipient to prepare a pending message or response to a received instant message when the recipient is offline or away from a desk or terminal;

b) determines the presence of the recipient in order to generate the pending message in response to an unanswered message;

c) extends the IM session; and d) secures the content of the message.

In order to provide the above advantages, we add a new feature to existing IM systems. In one embodiment of the invention, this new feature is provided as a wrapper around existing IM software. This feature is compatible with different IM systems.

In order to facilitate extended IM sessions in a secure way, users of an apparent extended session can anticipate the various responses that a peer would make and then prepare and store meaningful replies in advance. The responses and replies are associated with the particular session encounter by way of a unique identifier identifying that session encounter. This unique identifier may be a combination of UserIDs of the client and peer along with the session start time. Other identifiers may also be used to associate the responses with the session.

For example, a message that says "r u busy?" would prompt one stored answer. A message that says, "Hi, how are you?" would prompt another stored response. The appropriate reply would be sent only when the peer shows signs of having returned. One way to determine if the peer has returned to the screen is when she/he responds to the previously unanswered message. Other method for determining presence of the peer are also contemplated.

These prepared IMs let your correspondent know that you are not ignoring her/him. They also build on the experience of having a true face-to-face meeting. The pending messages would be managed in a "container" on the IM server, and would normally be deleted after having been sent.

Figure 1:
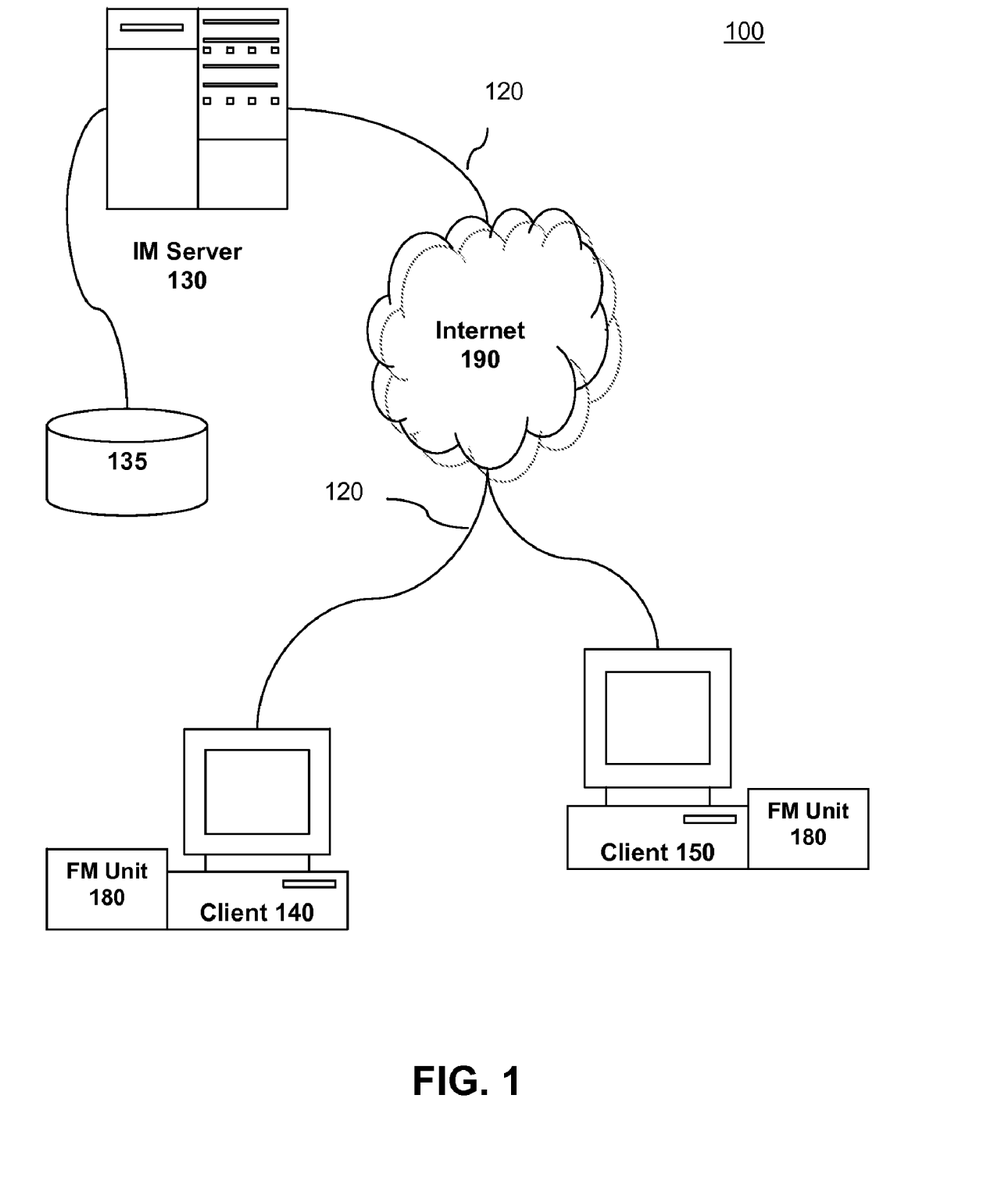
FIG. 1 depicts a general architecture of an Instant Messaging system configured to operate according to an embodiment of the present invention.

Referring now in specific detail to the drawings, and particularly FIG. 1, there is illustrated a pictorial representation of an information processing system 100 in which the present invention may be implemented, in accordance with certain presently preferred embodiments of the invention. In general, the routines which are executed when implementing these embodiments, whether implemented as part of an operating system or a specific application, component, program, object, download, module or sequence of instructions, will be referred to herein as computer programs, or simply programs. The computer programs typically include one or more instructions that are resident at various times in various memory and storage devices in an information processing or handling system such as a computer, and that, when read and executed by one or more processors, cause that system to perform the steps necessary to execute steps or elements embodying the various aspects of the invention.

Throughout the description herein, an embodiment of the invention is illustrated with aspects of the invention embodied on computer systems 140 and 150. As will be appreciated by those of ordinary skill in the art, aspects of the invention may be distributed amongst one or more networked computing devices which interact with computer systems 140 and 150 via one or more data networks.

Instant messaging server 130 enables clients 140 and 150 to communicate with one another and any other clients similarly connected to the internet 190 via a wireless network protocol 120 such as TCP/IP. Exemplary processing systems 140 and 150 include several components—a central processing unit (CPU), memory, network interface (I/F) and I/O interface. Each component is in communication with the other components via a suitable communications bus as required. Systems 140 and 150, for purposes of this discussion, are clients of IM Server 130. Each system 140 and 150 is a member of an Instant Messaging community and has a Future Message Unit 180 enabled with its Instant Messaging capabilities.

The FM Unit 180 may be embodied on a removable memory device such as a Zip™ drive, flash cards, CD-ROMs, static memory devices and the like. Removable media may be used to provide instructions for execution or as a removable data storage device.

Figure 3A:
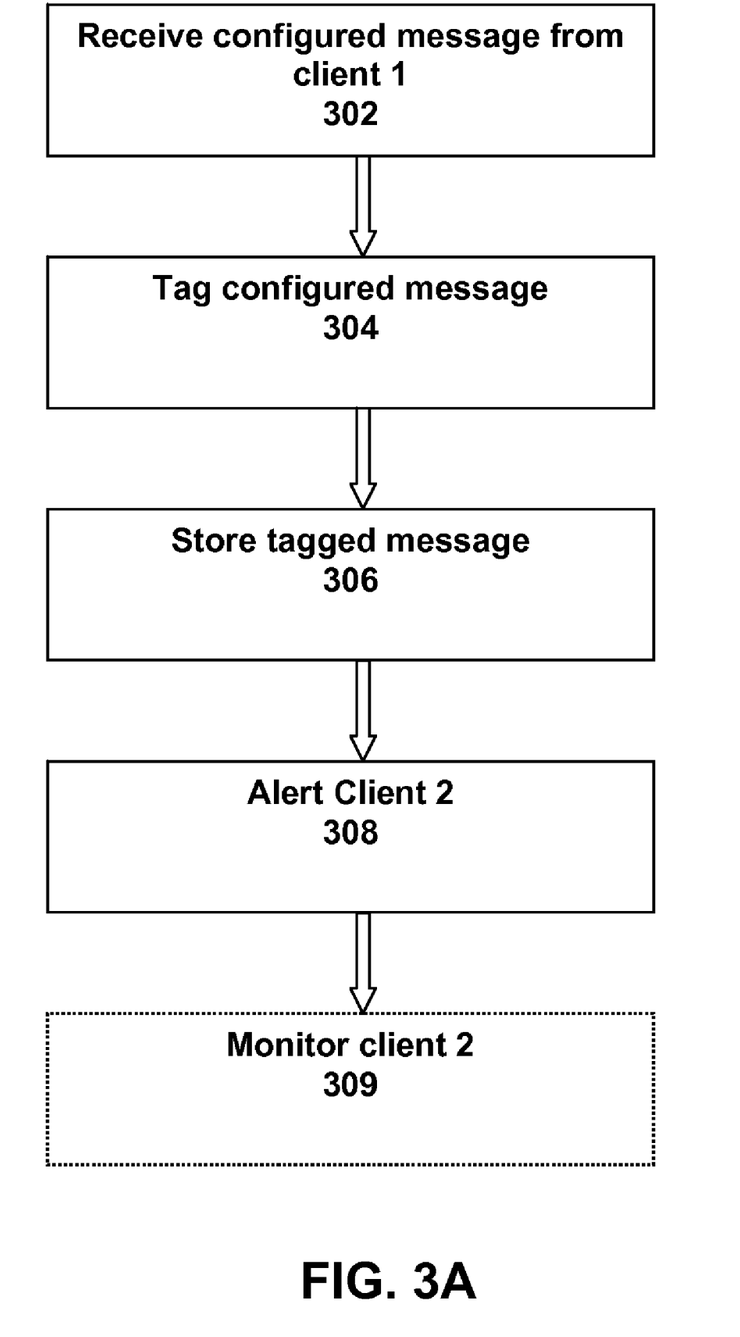
FIG. 3A is a flow chart of the server side process flow, according to an embodiment of the present invention.
Figure 3B:
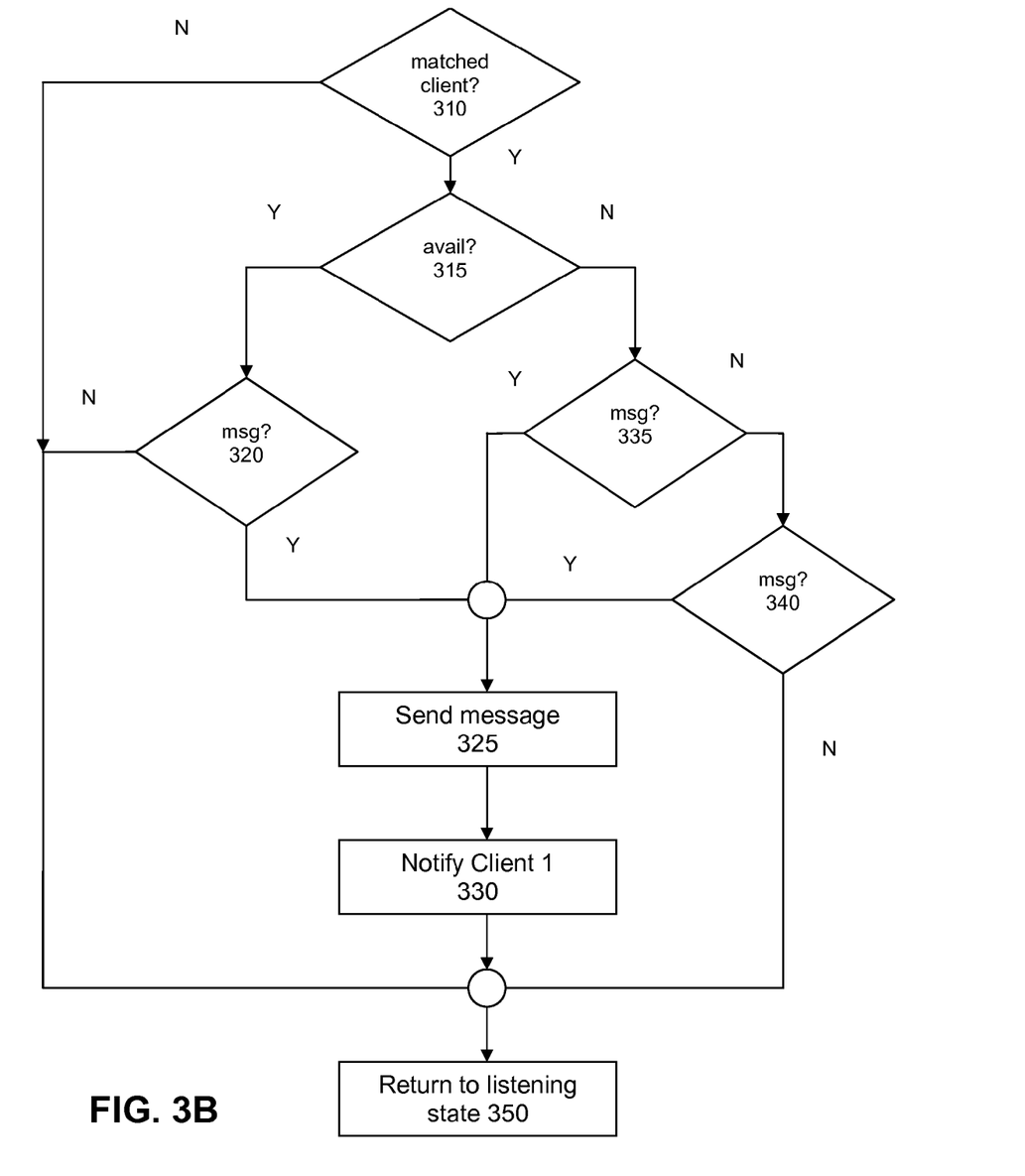
FIG. 3B is a flow chart continuing the process flow of FIG. 3A, according to an embodiment of the present invention.

The computer instructions/applications executed by IM Server 130 and FM Unit 180 (thus adapting the operation of computer system 100 as described herein) are illustrated in functional block form in FIG. 3A and FIG. 3B. Additionally, a data store 135 is used for storing messages to be delivered. The data store 135 may be embodied in the Server 130 or it may be a separate component, accessible either by wired or wireless connectivity. As will be appreciated by those of ordinary skill in the art, the delineation between aspects of the applications illustrated as functional blocks in FIG. 3A and FIG. 3B is somewhat arbitrary as the various operations attributed to a particular application as described herein may, in alternative embodiments, be subsumed by another application.

In a sample embodiment, an IM correspondent (User A) selects a button called "Set Future Message." This prompts a dialog box pop-up, where User A sets up a general message to be sent when User B becomes available. This message may be "I'm heading home, call me on my cell phone." Additionally, User A can set up alternative messages for predefined responses of User B and also a general message to be sent if User B responds with an unanticipated message. User A configures the required messages, logs off and heads home. The FM Unit 180 is in communication with the IM Server 130. The FM Unit 180 transmits the message configuration to the IM Server 130. The Server 130 saves the future message configuration and remains in wait mode until it receives an indication that User B is on-line and able to securely receive the configured message.

One embodiment of the invention begins with a typical instant messaging session. User A sends a message to User B. User B does not answer immediately. In the meantime, User B arrives at the office and activates his system by typing on the keyboard. Because User A set a message to be sent when the IM server is notified that User B is now on-line (as indicated by the keyboard activity), this stored message is sent to User B. Otherwise, when User B responds to User A's message, if the message matches one of the patterns defined by User A, the predefined message will be sent in response. User A can anticipate multiple messages coming one after another. Realistically though, usually only one sequence of messages will be used.

In addition, we use known methods to identify people's availability to receive messages—like working on the computer actively by activating the keyboard and/or mouse, and using a video camera to identify them as alone in front of the screen—to identify when the user is available to receive the prolonged conversation messages.

Figure 2:
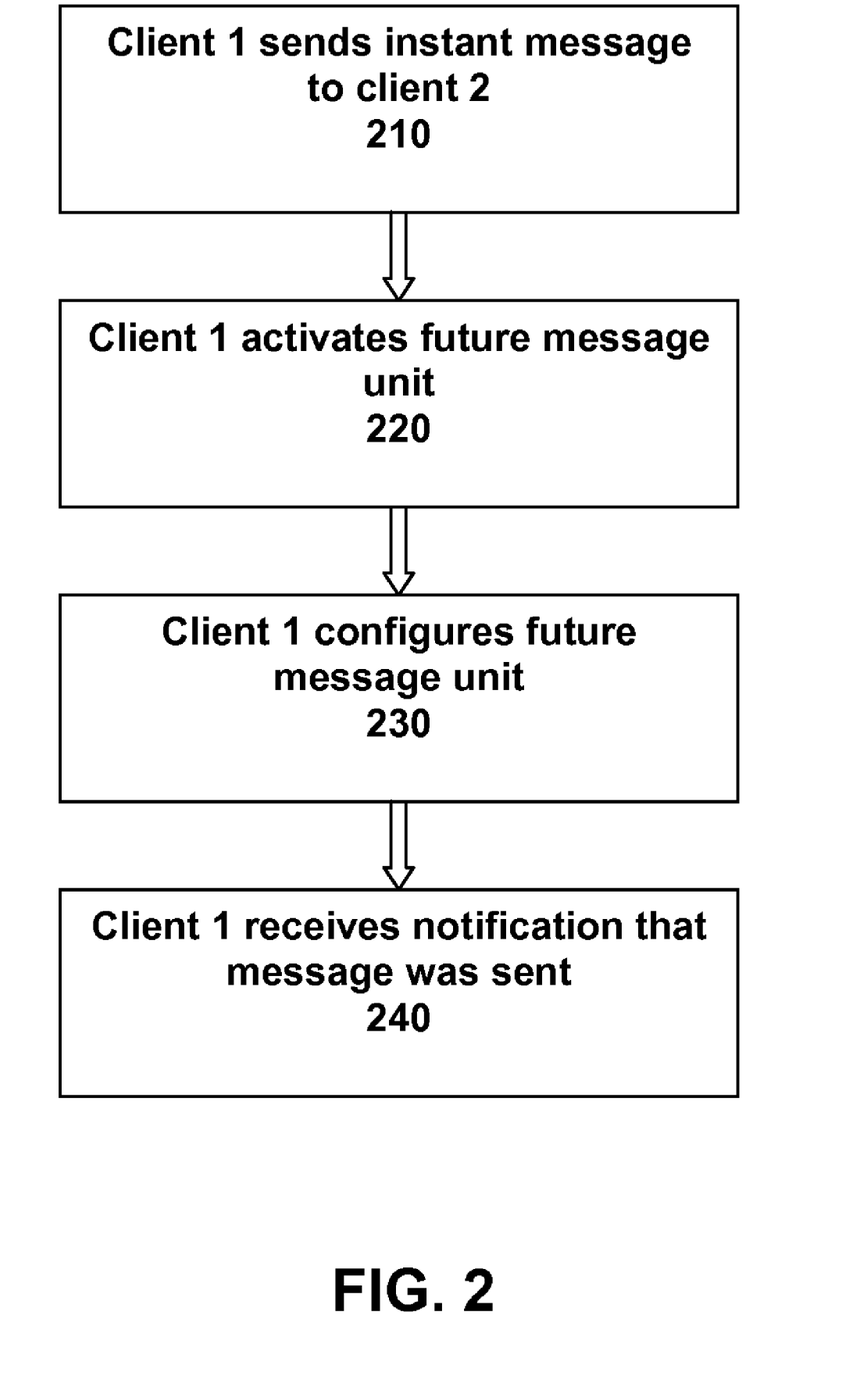
FIG. 2 depicts the architecture of an embodiment of the invention.

Referring to FIG. 2, there is shown a flow chart 200 of a method according to an embodiment of the present invention. First, in step 210 Client 140 sends a message to Client 150 through the IM server 130. Either immediately or after several minutes of inactivity (from Client 150), in step 220 Client 140 activates the Future Message Unit feature (FM Unit 180) associated with Client 140's IM application. Activating the FM Unit 180 can be accomplished by selecting an icon on the client's IM user interface, or by other means of selection. Once activated, the FM Unit 180 presents a pop-up window (dialog box) to Client 140. In step 230 Client 140 configures the FM Unit 180 through a user interface such as that shown in FIG. 4.

Configuring the FM Unit 180 includes (optionally) a) message to be sent when Client 150 becomes available for messages; b) one or more anticipated message(s) from Client 150 and corresponding responses to the message; c) a message to be sent when an unanticipated message is received from Client 150.

FM Unit 180 sends the description composed in the previous step 230 to IM Server 130. IM Server 130 then stores the message. Then IM Server 130 sends a notification to Client 150's FM Unit 180 that it is being monitored for sending prerecorded messages. FM Unit 180 monitors availability of the Client 150 and wakes up when the availability is changed to "available." For example, if Client 150's status was "available," or "on-line," then switched to "Away," then switched to "Offline" and then switched back to "Available," the FM Unit 180 will be prompted. FM Unit 180 sends notification to IM Server 130. If IM Server 130 determined that it has a stored availability message tagged for Client 150, it forwards that message to Client 150. At this point, optionally the IM Server 130 will send a notification to Client 140 that its message was sent in step 240.

If not, only when Client 150 sends a response message to Client 140's original message, will the IM Server 130 respond to this message. The IM Server 130 attempts to match the message against a list of predefined response messages. If matched to one of the predefined messages or alternatively if there is a general message defined, the IM Server 130 sends the message to Client 150. Potentially, the IM Server 130 may have stored more than one round of messages and then the above process might be repeated multiple times.

FIG. 3A is a flow chart 300 depicting the process flow between the IM Server 130 and the FM Unit 180. Process steps performed by FM Unit 180 are shown with dotted lines. In step 302 the IM server 130 receives a configured message from Client 140 as composed in step 230 above. Next, in step 304 the IM Server 130 must tag the message with an identifier so that it is associated with both Client 140 as the sender and Client 150 as the recipient. In an alternative embodiment, the identifier can be generated by the local FM Unit 180 when the client activates the FM Unit 180. In step 306 the tagged message is stored. The IM Server 130 then notifies Client 150 that it needs to be notified of Client 150's status changes in step 308. Next, in step 309 Client 150's FM Unit 180 begins monitoring Client 150's availability.

Referring now to FIG. 3B we continue with the process flow of FIG. 3A. At this point in the processing, Client 150's FM Unit 180 has notified the IM Server 130 that Client 150 is now available. The IM Server 130 receives the status notification from Client 150's FM Unit 180. In Step 310, the Server 130 then checks whether Client 150 is a client for which it has prerecorded messages stored. If the client is not matched, Server 130 goes back to the waiting for messages state at step 350

If, however, Client 150 is matched, the Server 130 then determines whether the status notification is an availability notification in step 315. If it is an availability notification, then in step 320 the Server 130 has to determine whether it has a pre-stored message tagged for Client 150 to be sent when Client 150 becomes available.

If the Server 130 determines that it has a pre-stored message tagged for Client 150, then in step 325 the Server 130 sends this message to the receiving Client 150. Optionally, in step 330, the Server 130 will notify Client 140 that the message was successfully delivered to Client 150. If, in step 320 it is determined that there is no message to be delivered, then the Server 130 returns to the listening state at step 350.

If the status notification is not an availability notification as determined in step 315, the Server 130 then determines whether there is a matched prerecorded message in step 335. If there is, the Server 130 sends this prerecorded message to the receiving client 150. If not, in step 340 the Server 130 next determines whether there is a general message to be sent in response to the message. If there is, again a message is sent to the Client 150. After delivering the messages, the Server 130 will delete them. If there is no general message to deliver, the Server 130 returns to its initial waiting state. At the end of the loop, the Server 130 returns to the waiting state at step 350.

Figure 4:
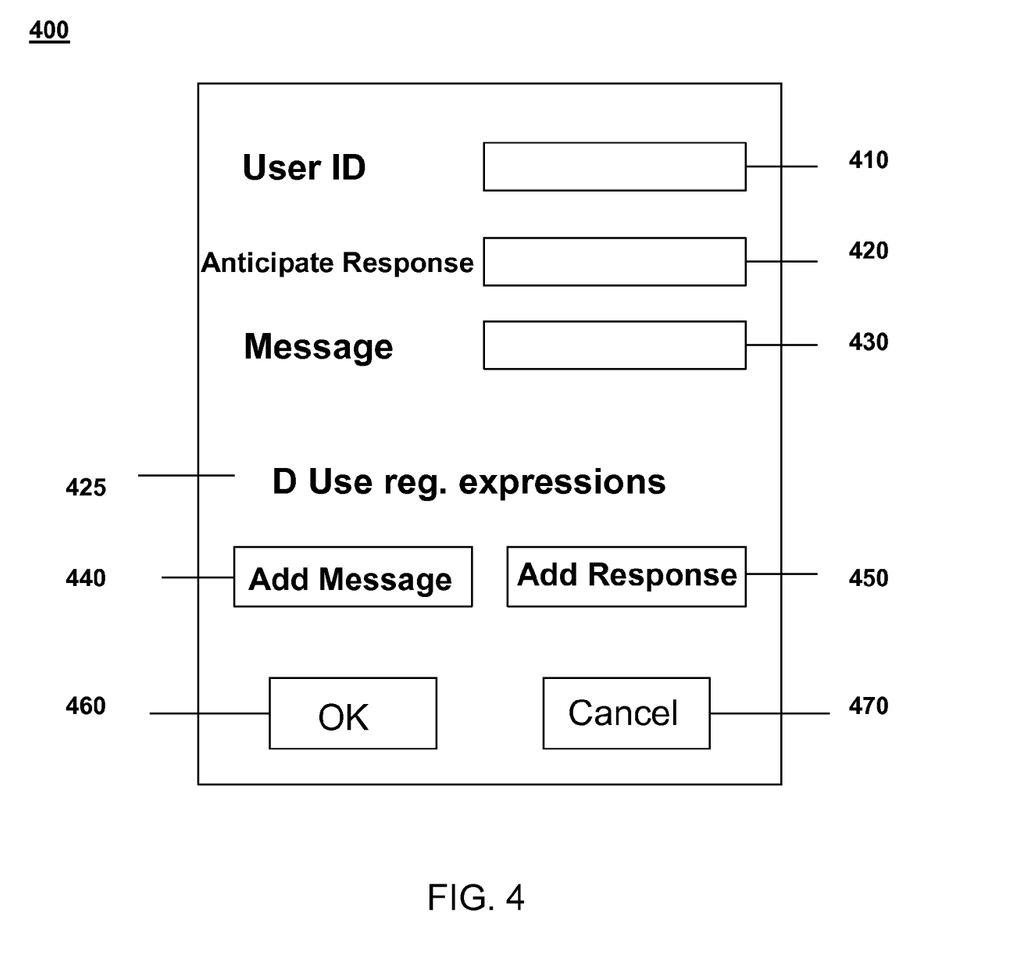
FIG. 4 depicts an exemplary user interface of a sample embodiment.

FIG. 4 shows a sample user interface 400 of a definition of prerecorded messages. Field 410 shows the user Id for which the definition is created. This will be the UserID of the intended recipient. Once entered, it will be associated with the sender's UserID. Field 420 shows a response to be matched. The user interface 400 can accommodate regular expressions if checkbox 425 is checked. Field 430 shows a message to send in response. If the box 425 is checked, field 430 can use matches from regular expressions in field 420.

Button 440 adds a new message to create a complex flow. For example, if after response 1 there is response 2 send message 2. Button 450 adds a new response to match regardless of previous responses. Button 460 causes the new definition to be sent to the server. Button 470 cancels the operation. Those with knowledge in the art will understand that user interface 400 is merely an exemplary embodiment depicting some of the functionality of the expanded IM session as described herein. Because the extended IM session provides a wrapper around proprietary IM software, the actual user interface will vary in keeping with the spirit and scope of the invention.

Figure 5:
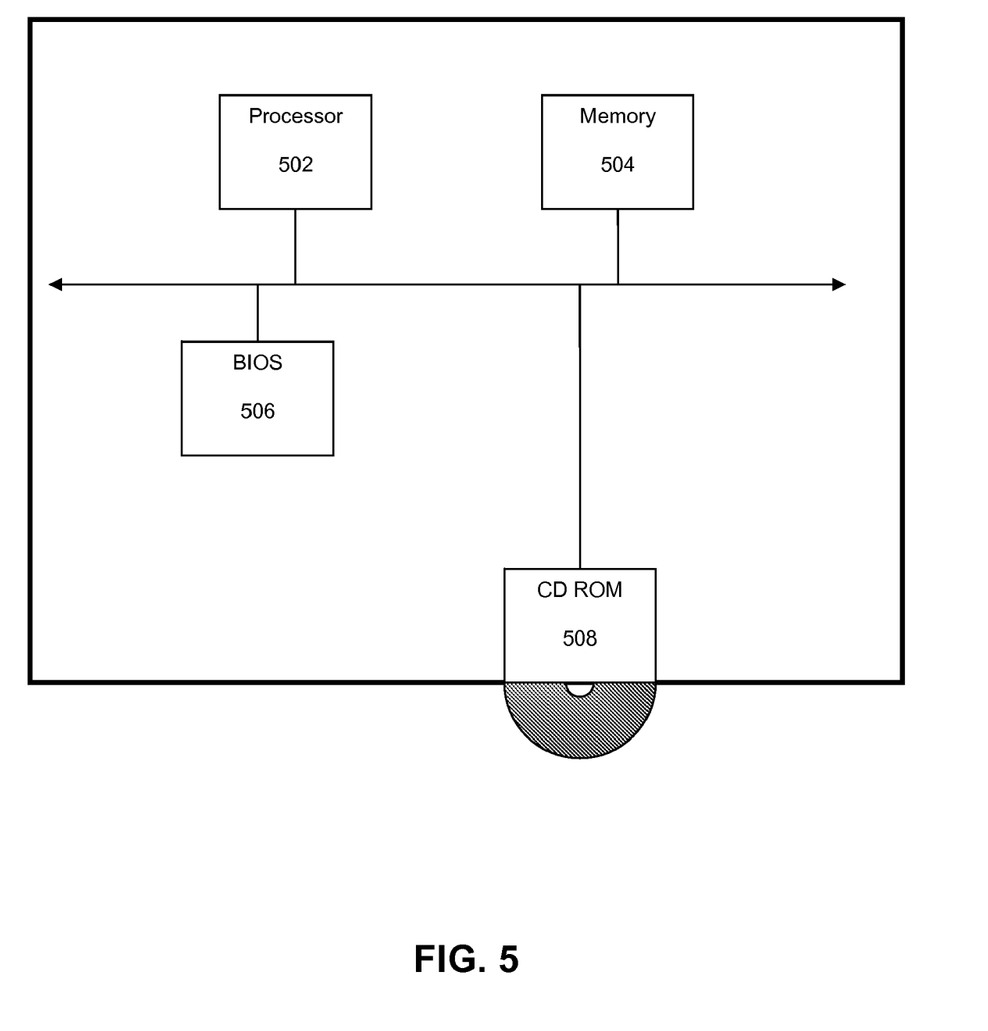
FIG. 5 shows a simplified block diagram of a computer system configured to operate according to an embodiment of the present invention.

Referring to FIG. 5, there is shown a simplified block diagram of an information handling system 500 consistent with an embodiment of the present invention. For purposes of this invention, computer system 500 is associated with client 140 and may represent any type of computer, information processing system or other programmable electronic device, including a client computer, a server computer, a portable computer, an embedded controller, a personal digital assistant, and so on. The computer system 500 may be a stand-alone device or networked into a larger system. The example depicted here is a highly-simplified depiction of a programmable computer apparatus. Those skilled in the art will appreciate that other low-level components and connections are required in any practical application of a computer apparatus.

The system 500 could include a number of operators and peripheral devices as shown, including a processor 502, a memory 504, and an input/output (I/O) subsystem 506. The processor 502 may be a general or special purpose microprocessor operating under control of computer program instructions executed from a memory in order to execute the method as described above. The processor 502 may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips. The memory may be partitioned or otherwise mapped to reflect the boundaries of the various memory subcomponents.

The memory 504 represents either a random-access memory or mass storage. It can be volatile or non-volatile. The system 500 can also comprise a magnetic media mass storage device such as a hard disk drive. The computer instructions/applications may be stored in memory 504 and executed by CPU 502, thus adapting the operation of computer system 500 as described herein.

The I/O subsystem 506 will preferably comprise various end user interfaces such as a display, a keyboard, and a mouse in order to operate the user interface 400. The I/O subsystem 506 may further comprise a connection to a network such as a local-area network (LAN) or wide-area network (WAN) such as the Internet. Processor and memory components are physically interconnected using conventional bus architecture. Additionally, combination input/output (I/O) devices may also be in communication with processing system 500. Examples of conventional I/O devices include removable and fixed recordable media (e.g., floppy disk drives, tape drives, CD-ROM drives, DVD-RW drives, etc.), touch screen displays and the like.

According to an embodiment of the invention, a computer readable medium, such as a CDROM 508 can include program instructions for operating the programmable computer 500 according to the invention.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

We claim:

1. A computer-implemented method comprising steps of:
    using one or more processor devices configured to perform:
        receiving a prompt from a user to activate a message interface in order to begin an on-line session;
        activating the message interface wherein the user sets up at least one message to be sent to at least one target correspondent when the at least one target correspondent becomes available, and enabling the user to set up alternative messages for predefined anticipated responses of the at least one target correspondent and also a general message to be sent when the target correspondent responds with an unanticipated message;
        presenting the message interface to the user;
        receiving user input from the message interface, said user input comprising:
            a user selection of the at least one target correspondent; and
            a first message to be sent to the at least one target correspondent;
        tagging the first message with a tag associating said first message with the user and the target correspondent;
        storing the first message;
        sending the first message to a messaging system for delivery to the target correspondent when the target correspondent is detected to be available to receive the first message;
        wherein sending the first message comprises delaying transmission of the first message until the target correspondent is available;
        receiving user input comprising the predefined anticipated responses expected to be received from the target correspondent and corresponding responsive messages matched with the predefined anticipated responses, said corresponding responsive messages to be sent only in response to receipt of responses from the target correspondent that match the predefined anticipated responses;
        tagging the predefined anticipated responses and the corresponding responsive messages with an identifier associated with the user and the target correspondent;
        storing the predefined anticipated responses and the corresponding responsive messages; and
        sending the corresponding responsive message to the message system for delivery to the target correspondent upon receipt of the predefined anticipated response.

2. The method of claim 1 wherein activating the message interface comprises instantiating a dialog box to be operated by the user.

3. The method of claim 1 further comprising:
    receiving further user input from the message interface, said user input comprising a user selection of an additional action to be taken;
    presenting a message screen to the user in response to the user selection;
    receiving user input from the message interface, through the message screen, the user input comprising a second message to be sent to the at least one target correspondent responsive to a different responsive transmission from the target correspondent; and
    sending the second message to the messaging system for delivery to the at least one target correspondent upon receipt of the different response transmission.

4. The method of claim 1 further comprising:
    monitoring availability status of the target correspondent; and
    transmitting the availability status to the messaging system when the availability status indicates that the target correspondent is available and able to receive messages.

5. The method of claim 4 wherein monitoring the availability status of the target correspondent comprises at least one action selected from a group consisting of:
    detecting keyboard input, detecting cursor movement, detecting voice commands, and detecting video presence of the target correspondent.

6. The method of claim 1 further comprising a step of generating a unique identifier for identifying the on-line session by combining user ids of the user and target correspondent with a start time of the on-line session.

7. A computer-implemented method comprising steps of:
    using one or more processor devices configured to perform:
        receiving a first message from a sender as part of an on-line session, the first message comprising a predefined anticipated message expected to be received from the recipient;
        receiving a second message comprising an answer to the predefined anticipated message to be delivered to the recipient upon receipt of a response matching the first message;
        tagging the first message and the second message with a unique identifier for the on-line session;
        storing the first message and the second message in a storage device;
        receiving a message from the recipient;
        matching the response to the first message;
        delivering the second message to the recipient responsive to matching the recipient's message to the first message;
        receiving a general message to be sent to the recipient;
        storing the general message; and delivering the general message to the recipient when the message from the recipient does not match the first message.

8. The method of claim 7 further comprising deleting the second message after it is delivered.

9. A computer program product embodied on a non-transitory computer readable medium and comprising code that, when executed, causes a processor to:
- receive a prompt from a user to activate a message interface in order to begin an on-line session;
- activate the message interface such that said message interface is presented to the user and is able to receive from said user, wherein said user sets up at least one message to be sent to at least one target correspondent when the at least one target correspondent becomes available, and enabling the user to set up alternative messages for predefined anticipated responses of the at least one target correspondent, and also a general message to be sent when the target correspondent corresponds with an unanticipated message;
- receive user input from the message interface, said user input comprising:
  - a user selection of the at least one target correspondent; and
  - a first message to be sent to the at least one target correspondent;
- send the first message to a messaging system for delivery to the target correspondent when the target correspondent is detected to be available, wherein the target correspondent is determined to be available when said target correspondent commences typing on a keyboard;
- receiving user input comprising the predefined anticipated responses expected to be received from the target correspondent and corresponding responsive messages matched with the predefined anticipated responses, said corresponding responsive messages to be sent only in response to receipt of responses from the target correspondent that match the predefined anticipated responses;
- tagging the predefined anticipated responses and the corresponding responsive messages with an identifier associated with the user and the target correspondent;
- storing the predefined anticipated responses and the corresponding responsive messages; and
- sending the corresponding responsive message to the message system for delivery to the target correspondent upon receipt of the predefined anticipated response.

10. The computer program product of claim 9 wherein the message interface is a graphical user interface.

11. The computer program product of claim 9 wherein the code further causes the computer to identify the session with a unique identifier.

12. The computer program product of claim 11 wherein the computer identifies the session with the unique identifier comprising a userid of the user, a userid of the target correspondent, and a time of the session.

13. A messaging system comprising:
- a wireless network;
- a plurality of messaging clients each operatively coupled with the wireless network for participating in on-line sessions, wherein each of the plurality of messaging clients comprise a message interface for receiving user input and allowing user configuration of the user input in order to begin the on-line session and a future message device, wherein the future message device stays in a sleep mode until a recipient's activity on a keyboard is detected and then the message is sent when the recipient is available; and
- a messaging server operatively coupled with the wireless network for:
  - receiving status of a plurality of the messaging clients;
  - receiving messages from the plurality of messaging clients;
  - storing the messages;
  - delivering the messages when the recipient is available, as determined by said recipient commencing typing on the keyboard;
  - receiving a first message from a sender as part of an on-line session, the first message comprising a predefined anticipated message expected to be received from the recipient;
  - receiving a second message comprising an answer to the predefined anticipated message to be delivered to the recipient upon receipt of a response matching the first message;
  - tagging the first message and the second message with a unique identifier for the on-line session;
  - storing the first message and the second message in a storage device;
  - receiving a message from the recipient;
  - matching the response to the first message;
  - delivering the second message to the recipient responsive to matching the recipient's message to the first message;
  - receiving a general message to be sent to the recipient;
  - storing the general message; and
  - delivering the general message to the recipient when the message from the recipient does not match the first message.

14. The messaging system of claim 13 wherein the message interface is activated by software downloaded by the messaging clients.

15. The messaging system of claim 13 wherein the message interface comprises a graphical user interface.

16. The messaging system of claim 13 wherein the graphical user interface comprises at least one free form text field.

17. The messaging system of claim 13 wherein the messaging server is further coupled with the wireless network for assigning a unique identifier to the on-line sessions.

18. The messaging system of claim 13 wherein the messaging clients assign unique identifiers to their on-line sessions through their message interfaces.

19. A system for extending an on-line session, the system comprising:
- a memory having program code stored therein;
- a processor device operatively coupled with said memory for carrying out instructions in accordance with said stored program code, and
- a future message device enabled with instant messaging capabilities, activated by selecting an icon on an IM user interface, wherein said program code, when executed by said processor device, causes said processor to:
  - receive a prompt from a user to activate a message interface in order to begin an on-line session;
  - activate the message interface such that said message interface is presented to the user and is able to receive input from said user;
  - receive user input from the message interface, said user input comprising:
    - a user selection of at least one target correspondent; and a first message to be sent to the at least one target correspondent when the at least one target correspondent becomes available;

send the first message to a messaging system for delivery to the target correspondent when the target correspondent is detected to be available, wherein the target correspondent is determined to be available when said target correspondent activates a system by typing on its keyboard;

receiving user input comprising the predefined anticipated responses expected to be received from the target correspondent and corresponding responsive messages matched with the predefined anticipated responses, said corresponding responsive messages to be sent only in response to receipt of responses from the target correspondent that match the predefined anticipated responses;

tagging the predefined anticipated responses and the corresponding responsive messages with an identifier associated with the user and the target correspondent;

storing the predefined anticipated responses and the corresponding responsive messages; and sending the corresponding responsive message to the message system for delivery to the target correspondent upon receipt of the predefined anticipated response.

20. The system of claim 19 wherein the program code further causes the processor to:

receive user input from the message interface, said user input comprising a user selection of an additional action to be taken;

present a message screen to the user in response to the user selection;

receive user input from the message interface, through the message screen, the user input comprising a second message to be sent to the at least one target correspondent, said second message responsive to a response transmission from the target correspondent; and send the second message to the messaging system for delivery to the at least one target correspondent upon receipt of the response transmission.

21. The system of claim 20 wherein the program code further causes the processor to:

monitor availability status of the target correspondent; and transmit the availability status to the messaging system when the availability status indicates that the target correspondent is available and able to receive messages.

22. The system of claim 19 wherein the program code further causes the processor to:

generate a unique identifier for the on-line session; and associate all messages pertaining to the on-line session with the unique identifier.

23. The method of claim 19 further comprising:

receiving user input comprising the general message to be sent to the target correspondent;

storing the general message; and sending the general message to the message system for delivery to the target correspondent when a response from the target correspondent does not match any of the predefined anticipated responses.

* * * * *